US006666475B2

(12) United States Patent
Kippschull

(10) Patent No.: US 6,666,475 B2
(45) Date of Patent: Dec. 23, 2003

(54) SIDE-CURTAIN AIRBAG AND METHOD OF MANUFACTURE

(75) Inventor: Bernd Kippschull, Rödermark/Urberach (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 39 days.

(21) Appl. No.: 09/962,639

(22) Filed: Sep. 25, 2001

(65) Prior Publication Data

US 2002/0167153 A1 Nov. 14, 2002

(30) Foreign Application Priority Data

May 11, 2001 (DE) .......................... 101 22 838

(51) Int. Cl.⁷ ............................................. B60R 21/22
(52) U.S. Cl. .................. 280/730.2; 280/743.2
(58) Field of Search .................. 280/730.2, 729, 280/743.1, 739, 743.2; 428/125, 35.2, 35.5, 36.1, 76

(56) References Cited

U.S. PATENT DOCUMENTS

| | | | |
|---|---|---|---|
| 6,024,380 A | * 2/2000 | Kim et al. ............... 280/743.1 |
| 6,042,141 A | * 3/2000 | Welch et al. ............. 280/729 |
| 6,095,551 A | * 8/2000 | O'Docherty ............. 280/730.2 |
| 6,176,513 B1 | 1/2001 | Neidert ................... 280/729 |
| 6,176,514 B1 | 1/2001 | Einsiedel ................ 280/730.2 |
| 6,237,943 B1 | 5/2001 | Brown et al. ............ 280/730.2 |
| 6,273,458 B1 | * 8/2001 | Steffens et al. .......... 280/730.2 |
| 6,290,253 B1 | 9/2001 | Tietze et al. ............. 280/730.2 |
| 6,299,965 B1 | 10/2001 | Keshavaraj .............. 428/125 |
| 6,460,877 B2 | * 10/2002 | Tanabe et al. ........... 280/729 |
| 2002/0105173 A1 | * 8/2002 | Saderholm et al. ...... 280/730.2 |

FOREIGN PATENT DOCUMENTS

| | | |
|---|---|---|
| DE | 29918198 | 4/2000 |
| DE | 20014706 | 8/2001 |
| GB | 2327066 | 1/1999 |
| WO | WO99/10207 | 3/1999 |

* cited by examiner

Primary Examiner—David R. Dunn
(74) Attorney, Agent, or Firm—Lonnie Drayer; Jarett Rieger

(57) ABSTRACT

A side-curtain airbag has at least two inflation chambers spaced apart from each other. The inflation chambers each have two fabric layers. The region between the two inflation chambers has at the most one layer of fabric. A method of manufacturing such a side-curtain airbag is disclosed.

4 Claims, 9 Drawing Sheets

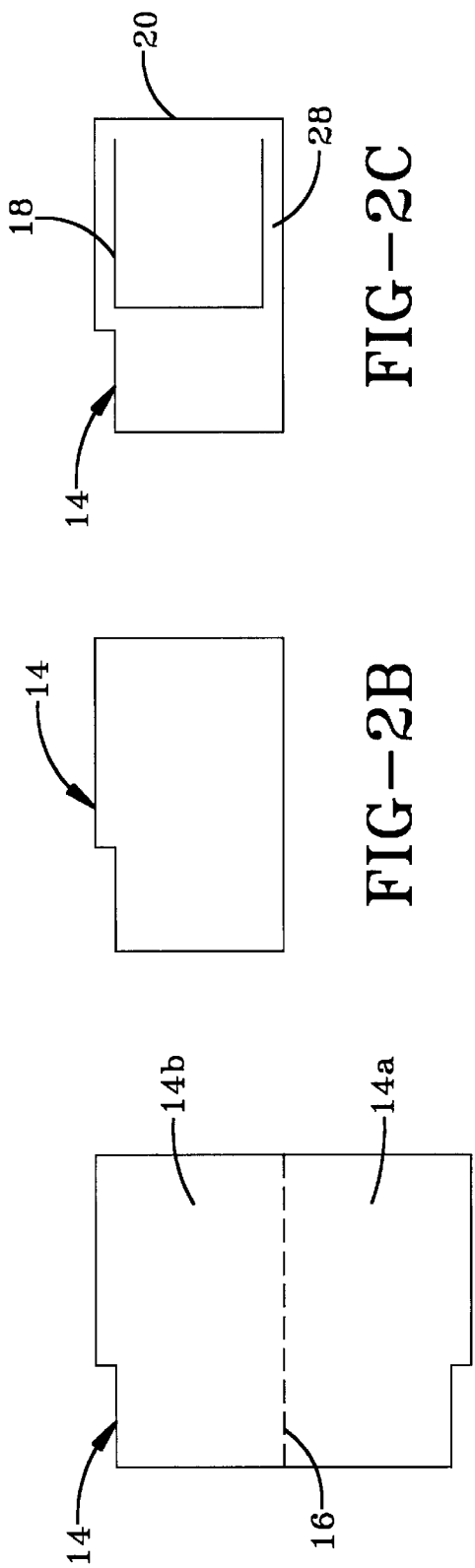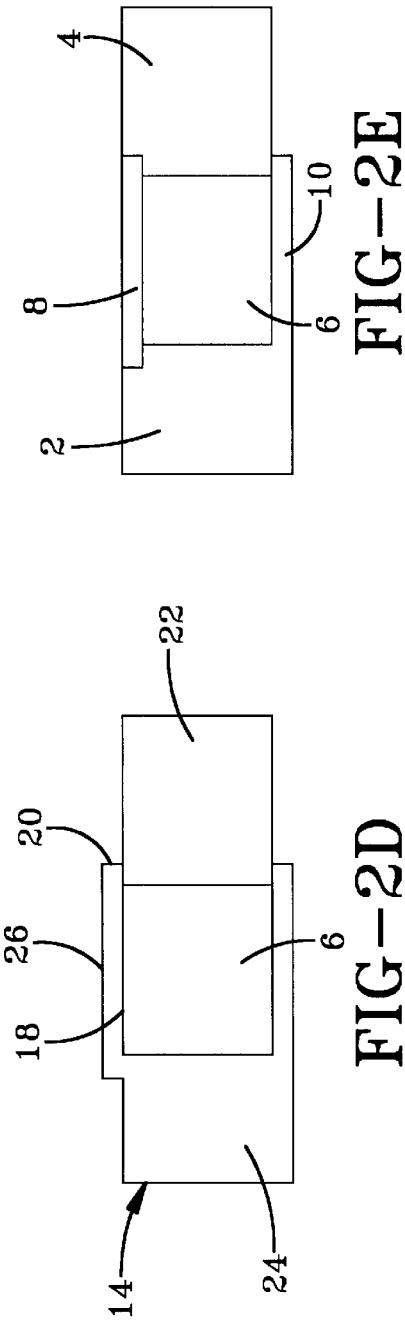

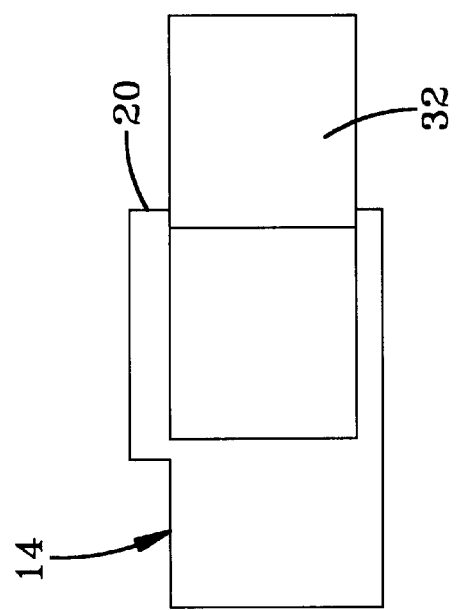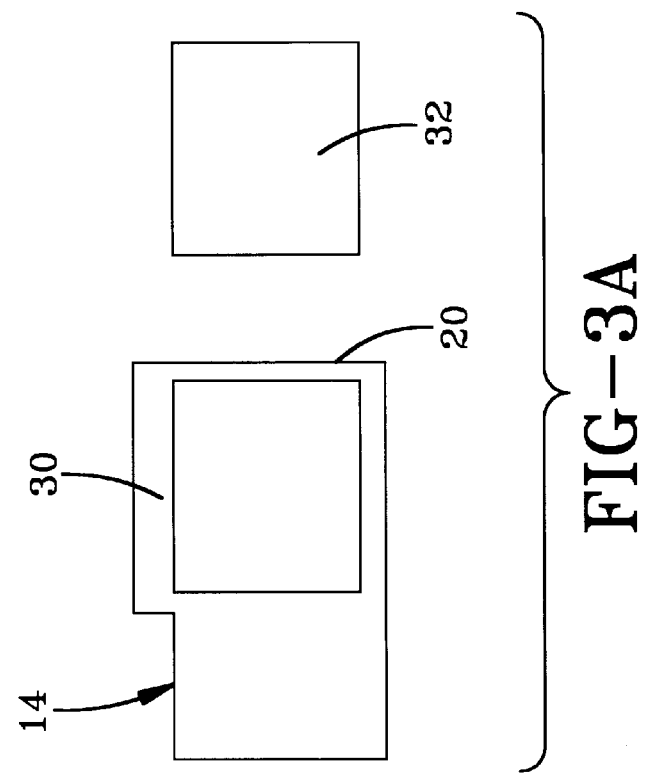

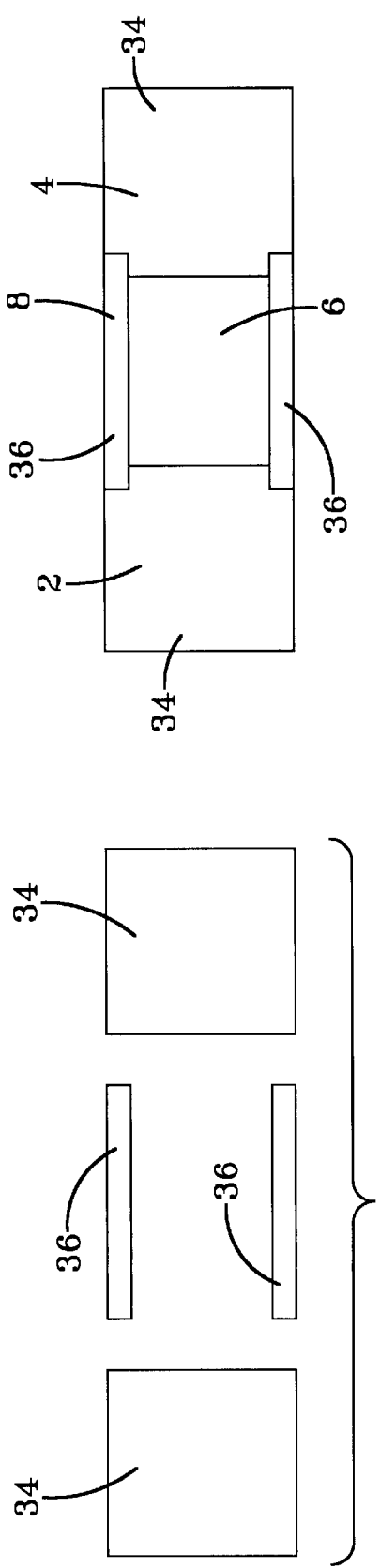
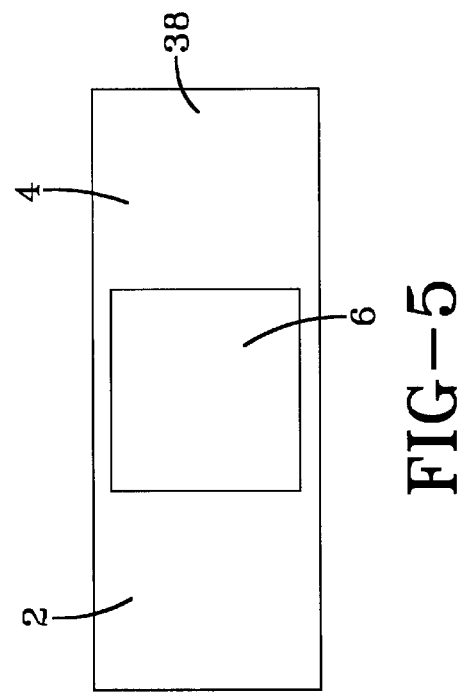

US 6,666,475 B2

SIDE-CURTAIN AIRBAG AND METHOD OF MANUFACTURE

FIELD OF THE INVENTION

The invention relates to a side-curtain airbag for a curtain airbag module along with a corresponding curtain airbag module and a method of manufacturing a side-curtain airbag.

BACKGROUND OF THE INVENTION

Side-curtain airbag modules in motor vehicles extend from a roof beam of the vehicle along the vehicle side. A side-curtain airbag generally extends from an A-pillar of a motor vehicle to a C-pillar of the vehicle along the side of the vehicle originating from the lateral roof beam of the vehicle. The inflated side-curtain airbag provides lateral protection for the head and upper body of the vehicle occupant. The side-curtain airbag in this case extends essentially parallel to the side window or the inner side of the vehicle between the head of the vehicle occupant and the vehicle side window. Since the side-curtain airbag extends along the entire length of the vehicle, it protects the occupants of the front seats as well as the occupants of the rear seats. In the region between front and rear seats, that is to say in the region of B-pillar of the vehicle, no protection is required. In this region of the side-curtain airbag is generally separated from inflation chambers by tucks, to keep the inflation chamber volume as small as possible. In this way, dead spaces are created, which during the inflation of the side-curtain airbag are not inflated with gas. The side-curtain airbag is generally manufactured from a coated fabric that is relatively costly. In addition, due to its large length, the side-curtain airbag requires a large amount of fabric, which adds to the cost of such side-curtain airbags.

The side-curtain airbag according to the invention has the advantage that, between the two inflation chambers at the most one layer of the fabric is located, from which the inflation chambers also are formed. Both inflation chambers, the first one of which is generally located in the region of a front seat of the vehicle and the second in the region of a rear seat of a vehicle, are thus not two continuous fabric pieces. The two inflation chambers are separate, whereby at the most one fabric layer of the fabric creating the inflation chambers is a continuous width of fabric extending over the entire length of the vehicle. In this way part of the costly fabric material, which creates the inflation chambers, can be economized on in comparison with former embodiments, in which regions between two fabric layers were separated from the inflation chambers by tucks. Because the inflation chambers are for the regions of the side-curtain airbag that protect a vehicle occupant, the required gas volume can be reduced. A reduced gas volume enables the use of smaller gas generators, which results in a further reduction in cost. In addition, a reduced gas or air volume results in a more rapid inflation of the side-curtain airbag, whereby the side-curtain airbag more rapidly assumes the desired position for the protection of the vehicle occupants. A smaller fabric surface also ensures lower friction during the unfolding process, thus also contributing to a more rapid unfolding process.

The curtain airbag module according to the invention comprises a side-curtain airbag with the above described characteristics. In this way it is possible to manufacture a particularly cost-effective side-curtain airbag module.

BRIEF DESCRIPTION OF THE DRAWINGS

FIGS. 2A to 2E are a diagrammatic representation of a method of manufacturing a side-curtain airbag according to the invention.

FIGS. 3A and 3B show a variation of the method shown in FIGS. 2A to 2E.

FIGS. 4A and 4B are a diagrammatic representation of an alternative method of manufacturing a side-curtain airbag according to the invention.

FIG. 5 is a diagrammatic representation of an alternative method of manufacturing a side-curtain airbag according to the invention.

DETAILED DESCRIPTION OF THE INVENTION

Figure 1A:
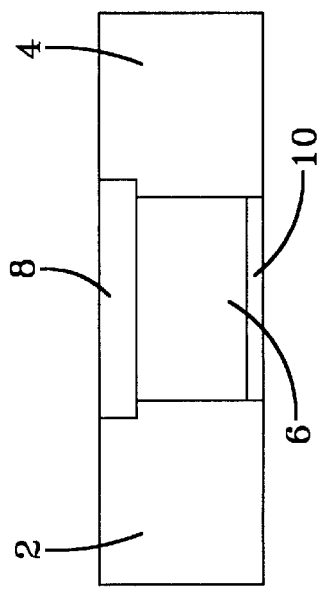
FIGS. 1A to 1D are diagrammatic representations of four basic embodiments of side-curtain airbags according to the invention.

FIG. 1A is a diagrammatic representation of a first embodiment of a side-curtain airbag according to the invention. Two inflation chambers 2, 4 are spaced apart from one another with a free space 6 located between the two inflation chambers. The inflation chambers are separate and at a distance from each other. In the region between two inflation chambers, a width of fabric is not absolutely required, since the side-curtain airbag does not need to provide protection in this region for a vehicle occupant. In the built-in state, this region is located mostly directly behind the front seat back in the region of B-pillar of the vehicle, that is to say in a position in which no vehicle occupant is situated. The two inflation chambers 2, 4 are connected to one another via a narrow hose-shaped cover 8. This cover accommodates a gas supply line (not shown) to supply the first and the second inflation chamber with gas. The gas supply line is preferably in the shape of a tube or hose that extends through the inflation chambers 2, 4 and the cover 8. The gas supply line connects the inflation chambers with an externally located gas generator. In side-curtain airbag modules, the gas generator is generally located in the region of a C-pillar of a motor vehicle. Advantageously, no openings are located in the gas supply line in the region of the cover, so that the gas flows into the first and second inflation chambers only. The cover therefore need not be gas tight. It merely serves the purpose of guiding the gas supply line into the side-curtain airbag. Alternatively, however, a gas tight configuration of the cover is possible.

If, for example, the side-curtain airbag shown in FIG. 1A is located in a vehicle such that the side-curtain airbag in an unfolded state extends along an inner side of the vehicle starting from the roof beam the inflation chamber 2 is a front inflation chamber that extends along a front side window for the protection of a front seat occupant. The inflation chamber 4 in this case forms a rear inflation chamber that extends along a rear side window of the vehicle for the protection of a rear seat occupant. With this arrangement the free space 6 is located in the region of a seat back of the front seat and a B-pillar of the vehicle. In this region, no protection by the side-curtain airbag is required, since there is generally no vehicle occupant in this region. A gas supply line could, for instance, start from the C-pillar of the vehicle, extend through the rear inflation chamber 4 and the cover 8 into the front inflation chamber 2. In this case the gas supply line advantageously has openings only in the region of the inflation chambers 2, 4. The cover 8 does not necessarily have to be made of a particular material, for instance a gas tight material, since it serves merely to hold and guide the gas supply line. The described arrangement of the side-curtain airbag shown in FIG. 1A is merely an example. The free space 6 can also be located in any other region of the side-curtain airbag, in which no protective function is required. Due to the arrangement of the free space 6, the volumes of the inflation chambers 2, 4 are minimized to the dimensions required to protect a vehicle occupant and the amount of fabric material is economized. Furthermore, in one side-curtain airbag several free spaces 6 and more than two inflation chambers 2, 4 can be created. This depends in particular on the design of the vehicle in which the side-curtain airbag is to be installed. In a vehicle with three rows of seats, for instance, a side-curtain airbag having three inflation chambers can be foreseen.

Figure 1B:
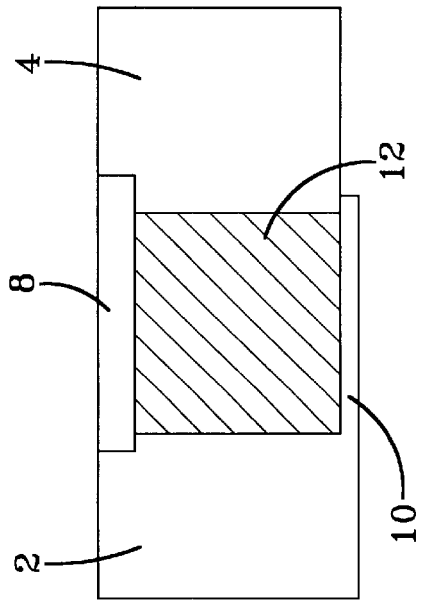

FIG. 1B shows a side-curtain airbag, which corresponds essentially to the side-curtain airbag shown in FIG. 1A and further comprises a connecting strip 10 located in the lower region of the free space 6 between the inflation chambers 2, 4. The connecting strip 10 ensures improved positioning and fixation of the inflation chambers 2, 4 when the side-curtain airbag is deployed. The connecting strip 10 can be a separate connecting piece, which is later connected to the inflation chambers 2, 4, for instance by sewing, gluing or welding. The separate configuration of the connecting piece enables a higher flexibility with regard to the combination of different materials, since the connecting strip does not have to be manufactured from the same material as the fabric layers. The connecting strip 10 can furthermore be one piece with the fabric layers of the inflation chambers 2, 4. The connecting strip can for instance be woven in one piece, with the regions of the fabric layers, which form the two inflation chambers. As a result, later connecting processes are avoided.

Figure 1C:
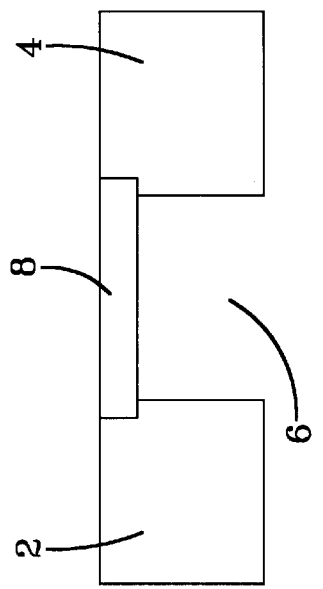

FIG. 1C shows a variation of the embodiment shown in FIG. 1B, but having two connecting strips 10 that extend in the free space 6 between the inflation chambers 2, 4 in a mutually crossing manner. In this case also the connecting strips can be one piece with the fabric layers of the inflation chambers 2, 4 or they can later be secured to the inflation chambers 2, 4 as separate connecting elements. The rest of the configuration corresponds to that of FIGS. 1A and 1B.

Figure 1D:
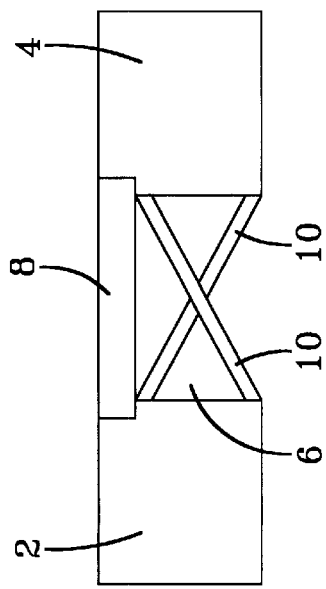

FIG. 1D shows a further embodiment of a side-curtain airbag according to the invention. The embodiment is similar to that shown in FIG. 1B, but there is no free space between the inflation chambers 2, 4 and a fabric layer 12 is located between the inflation chambers 2, 4. The fabric layer 12 can correspond to the fabric material of the inflation chambers 2 and 4. In this case the fabric layer is advantageously one piece with one of the fabric layers of the inflation chambers. Preferably the fabric layer 12, comprises a simple fabric material, which does not need to fulfil any particular requirements. A very cost-effective material can be used in this case, which does not have to have the material properties of the fabric material of the inflation chambers 2, 4. Consequently, costly fabric material can also be economized on in this embodiment, and a cost-effective side-curtain airbag can be achieved. The inflation chambers 2, 4 as well as the cover 8 and the connecting strip 10 can advantageously be manufactured as one piece of a fabric layer, as will be described with reference to FIGS. 2A to 2D. The fabric layer 12 preferably comprises a low friction, that is to say a smooth, material. This favors a rapid and even unfolding of the side-curtain airbag. The other aspects of the design and function of the side-curtain airbag according to FIG. 1D correspond to the embodiments described with reference to FIGS. 1A to 1C.

FIGS. 2A to 2E are a diagrammatic representation of the manufacture of a side-curtain airbag according to the invention. In FIG. 2A, first a cutting 14 of a fabric material is spread out. The fabric material has the well known required properties for a side-curtain airbag. In particular the fabric is gas tight and resistant to the used inflation gases. The fabric material can for instance be coated with a suitable compound. The upper section of the cutting 14 shown in FIG. 2A later forms the inner side of the airbag, respectively the inflation chambers. The lower section 14a of the cutting 14 is folded upwardly around a fold line 16, so that it comes to lie on the upper section 14b in a congruent manner, as shown in FIG. 2B. An incision 18 is made in the folded cutting 14 as shown in FIG. 2C. The incision 18 extends through the two superimposed sections 14a, 14b of the folded cutting 14. The incision 18 is essentially U-shaped, whereby the U-shaped form opens towards a lateral edge of the cutting 14. The free ends of the incision 18 lie near the lateral edge 20 of the cutting 14. In FIG. 2D, the cut off section 22 formed by the incision 18 is folded outwardly in the direction of the lateral edge 20. In this case the section 22 is also two layers. The section 22 later forms the second inflation chamber 4 and the remaining section 24 of the cutting 14 later forms the first inflation chamber 2, as shown in FIG. 1B. A free space 6 is created between the sections 24, 22. Fabric strips 26 of the two sections 14a, 14b remain, and are folded downwards and later form the cover 8 for the gas supply line, as shown in FIG. 1B. To this effect it is required that on the upper end of the left lateral edge of the section 22, a small incision or a small opening is provided, through which the gas supply line can later extend into the second inflation chamber 4. In the lower region of the cutting 14, the fabric strip remains, forming a connecting strip 10, as shown in FIG. 1B. The folded parts of the fabric are connected to one another by their outer peripheral edge, for instance by welding, sewing or gluing. In this way the airbag shown in FIG. 2E is manufactured, essentially corresponding to the airbag shown in FIG. 1B. Alternatively, both fabric layer sections can be folded out of the fabric layer each to one side, that is to say opposite one another. In this case the original inner sides of the fabric layers form the outer sides of the second inflation chamber. This procedure step is thus suitable only for fabric with two sides having the same properties. In both alternative procedure steps, the cut out section comes to lie outside the original surface of the fabric layers. As a result, two inflation chambers that are distanced from each other are formed with an intermediate free space. Both inflation chambers are connected to each other by two webs, which remain to the side of the cutting lines.

The upper web is advantageously simultaneously used for forming a cover for accommodating a gas supply line. To create a side-curtain airbag as shown in FIG. 1A, the connecting web 10 can be dispensed with. This is achieved by designing the incision shown in FIG. 2C in such a manner that it extends to the bottom edge 28 of the folded cutting 14, that is to say to the middle line 16 of the cutting 14. The incision 18 in this case has an L shape. Due to the later connection of the cut out section with the remaining fabric layers, an extremely flexible side-curtain airbag is created. For instance, the cut out region does not have to be cut out in a border region of the fabric layers to enable an unfolding according to the above described embodiment. The cut out section and the remaining fabric layers can for instance be connected to each other by sewing, welding or gluing.

FIGS. 3A and 3B show a variation of the method described with reference to FIGS. 2A to 2E. The cutting 14 is first folded such that the form shown in FIG. 2B is created. Then an incision 30 is made which, in contrast to FIG. 2C forms a continuous line. In FIG. 3A the incision 30 is essentially rectangular. In this way a section 32 of the two superimposed fabric layers of the cutting 14 is completely separated from the latter. Finally the removed section 32 is connected once again to the remaining part of the cutting 14, as shown in FIG. 3B. The removed section 32 is attached to a lateral edge 20 of the cutting 14. The arrangement shown in FIG. 3B essentially corresponds to the arrangement according to FIG. 2D. The rest of the method is carried out as described with reference to FIGS. 2D and 2E.

The method described with reference to FIGS. 2A to 2E and FIGS. 3A and 3B can be varied in many ways, depending upon the design of the airbag that is to be manufactured. The procedure of cutting out and folding can be repeated several times, depending on how many inflation chambers and how many regions of the airbag that will not to be inflated are to be created. The cut out regions also do not have to be rectangular in shape, rather their shapes can be adjusted to the desired embodiment of the airbag. Furthermore, a fold can follow a direction other than a lateral direction, to produce a airbag having a different shape. In this way costly fabric material can be economized on. The cut out section of the fabric layers is located outside the original surface of the fabric layers and preferably connected to these fabric layers, which form a first inflation chamber, to create a one-piece side-curtain airbag with two inflation chambers. In this side-curtain airbag, a free space is thus created between the two inflation chambers.

FIGS. 4A and 4B show a further method of manufacturing a side-curtain airbag. As shown in FIG. 4A, first two fabric sections 34 are prepared, which form the inflation chambers 2, 4, as shown in FIGS. 1A and 1B. The fabric sections 34 have in each case at least two layers, to form an inflation chamber. The two-layered configuration can be achieved through folds out of one fabric layer in each case, similar to the procedure disclosed with reference to FIGS. 2A and 2B. It is also possible to superimpose in each case two separate fabric layers and to connect them to each other at their periphery. It is furthermore possible to weave the two superimposed fabric layers as one piece. The two fabric sections 34 are connected to each other via two connecting strips 36. The connecting strips 36 can be made of a simple material, as the latter does not necessarily have to be gas tight like the material of the inflation chambers. The connecting strips 36 are sewn, stapled, glued, welded or connected in any other suitable manner to the fabric sections 34. The airbag shown in FIG. 4B is thus created, essentially corresponding to the airbag shown in FIG. 1B. Between the two inflation chambers 2, 4, a free space 6 is created between the two connecting strips 36. The upper connecting strip 36 is advantageously created as a cover 18 for a gas supply line, as described with reference to FIGS. 1A to 1D. The connecting strips 36 can alternatively also be oriented in a crosswise manner, as shown in FIG. 1C.

FIG. 5 shows a further embodiment of a side-curtain airbag according to the invention that essentially corresponds to the embodiments disclosed with reference to FIG. 1B. The embodiment of FIG. 5 differs in that at least one of the fabric layers is woven as one piece. The airbag comprises two congruent superimposed fabric layers 38, which have the shape or contour of the finished airbag. Two inflation chambers 2, 4 are created, with an intermediate free space 6. The airbag can have two congruent fabric layers 38 that are woven in the shape shown in FIG. 5, and are superimposed and connected to each other by their peripheral edges. It is preferable, however, that the two fabric layers 38 are woven as one piece at the same time, so that no further connecting processes are required. The two fabric layers 38 are woven together by their peripheral edges. In this way a two-layered structure is created, which is woven as one piece. This method has the advantage that no further connecting processes have to be carried out. The rest of the configuration of the airbag shown in FIG. 5 corresponds to the embodiment disclosed with reference to FIG. 1B. The side-curtain airbag according to FIG. 5 can be alternatively varied corresponding to the embodiments disclosed with reference to FIGS. 1B, 1C and 1D.

Figure 6A:
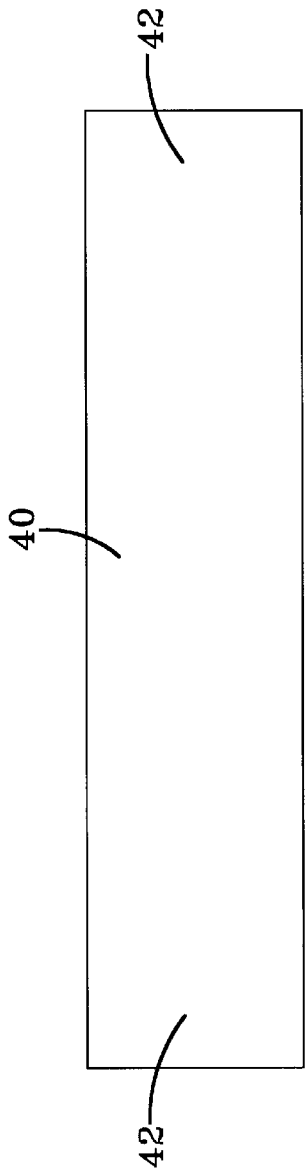
FIGS. 6A and 6B are a diagrammatic representation of an alternative method of manufacturing of a side-curtain airbag according to the invention.
Figure 6B:
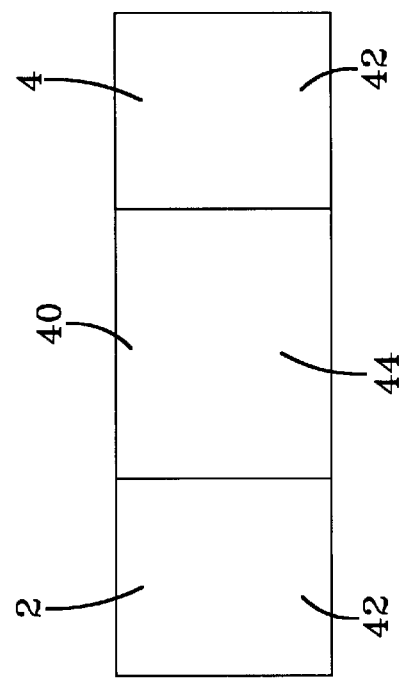

FIGS. 6A and 6B are a diagrammatic representation of a further method of manufacturing a side-curtain airbag for a side-curtain airbag module. A fabric layer 40 has a greater length than the side-curtain airbag that is to be manufactured. The fabric layer 40 comprises a material having properties suitable for a side-curtain airbag. These properties can in particular concern gas tightness, resistance to tearing, weight etc. The two end sections 42 of the fabric layer 40 that are opposite each other are folded inwards towards one another so that they come to lie flat on the fabric layer 40. In this way two double-layered regions are created, as shown in FIG. 6B. Between the two double-layered regions that are created by the end regions 42, a single-layer middle region 44 is created. The folded over end sections 42 are connected at their outer edges to the underlying fabric layer 40, for instance by sewing, welding or gluing. In this way a side-curtain airbag is created which essentially corresponds to the shape disclosed with reference to FIG. 1D. In the embodiment according to FIG. 6B, the middle region 44, however, is formed by a fabric layer that comprises the same material as the fabric layers that form the inflation chambers 2, 4. In this embodiment, however, as opposed to conventional side-curtain airbags of side-curtain airbag modules, a fabric layer in the middle region 44 is economized on. In addition, the inflation chambers 2, 4 in FIG. 6B can be connected by a cover 8, as shown in FIG. 1D, to create a receiver for a gas supply line.

Figure 7B:
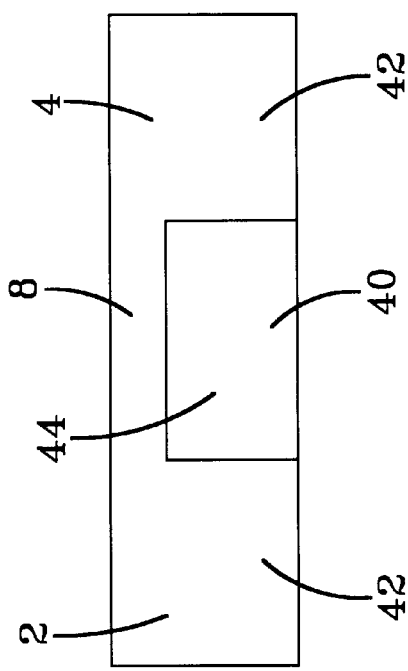
FIGS. 7A and 7B show a variation of the method shown in FIGS. 6A and 6B
Figure 7A:
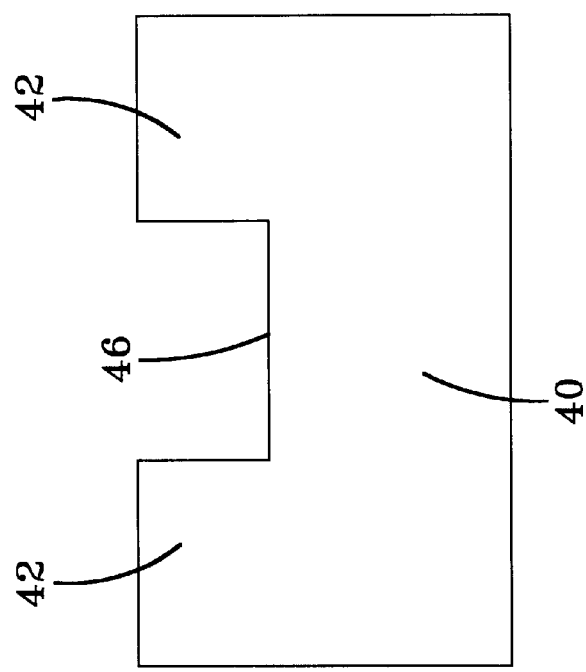

FIGS. 7A and 7B show a variation of the method of manufacturing a side-curtain airbag described with reference to FIGS. 6A and 6B. In the embodiment according to FIG. 7A, the fabric layer 40 is not oblong, rather the end regions 42 extend laterally from one lateral edge 46 of the fabric layer 40, that is to say the fabric layer has a U-shape. The end regions 42 are folded parallel to one another on the remaining part of the fabric layer 40, so that the end regions 42 form along with the underlying fabric layer 40 two inflation chambers 2, 4, as shown in FIG. 7B. In this way also between the two end regions 42 in the region of the lateral edge 46 a small strip of the fabric layer 40 is folded over to create a cover 8 between the chambers 2, 4, as shown in FIG. 7B. The cover 8 has the function disclosed with reference to FIGS. 1A and 1B of accommodating a gas supply line. As with the embodiment shown in FIG. 6B, in FIG. 7B the region between the inflation chambers 2, 4 is also a single layer through the middle region 44 of the fabric layer 40.

Figure 8A:
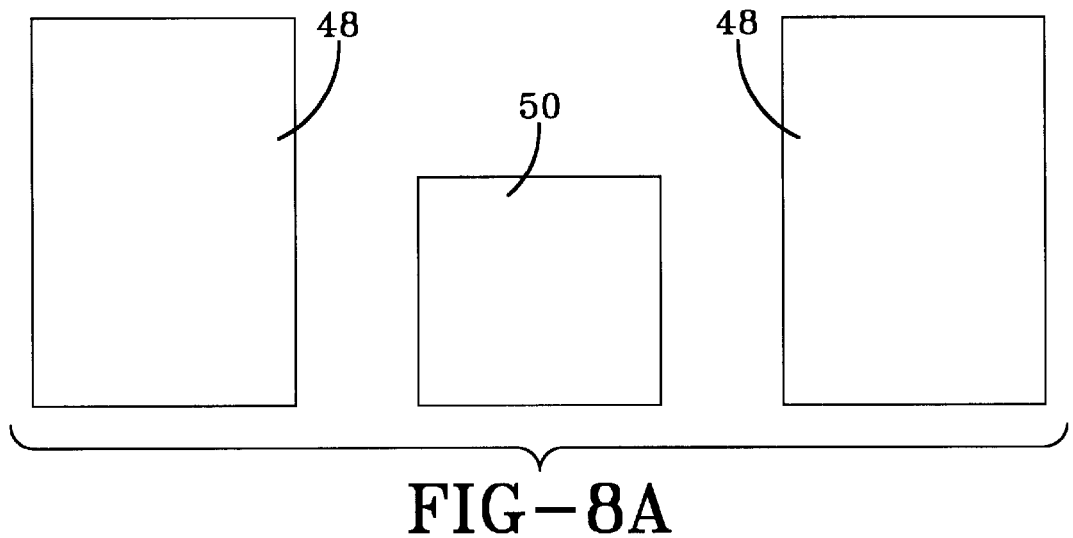
FIGS. 8A to 8C are a diagrammatic representation of an alternative method of manufacturing of a side-curtain airbag according to the invention.
Figure 8B:
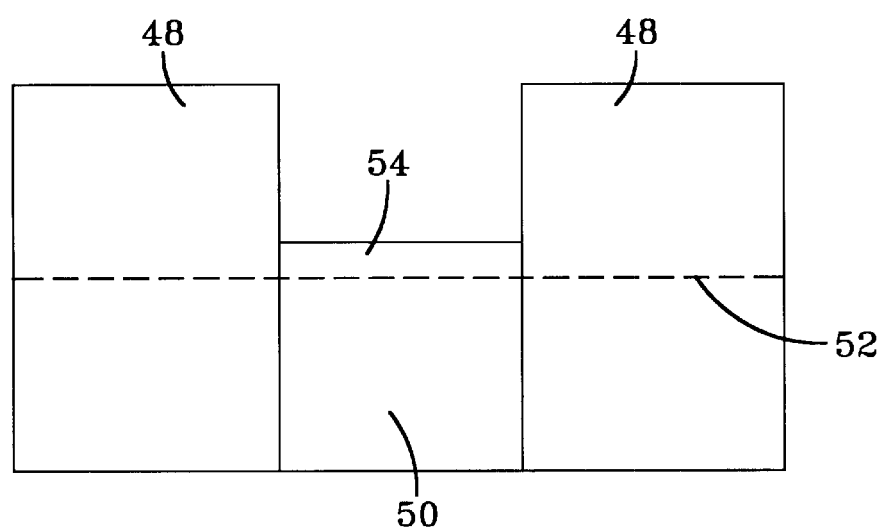
Figure 8C:
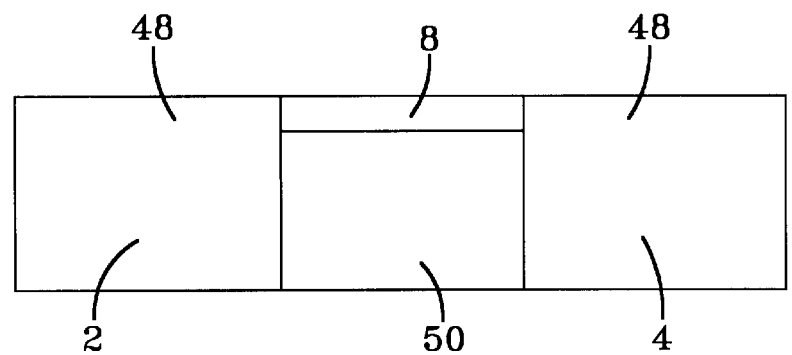

FIGS. 8A to 8C show a further method of manufacturing a side-curtain airbag according to the invention. In FIG. 8A the side-curtain airbag is formed out of three fabric sections. Two fabric sections 48 form the inflation chambers 2, 4, as seen in FIGS. 1B to 1D. The fabric section 50 preferably comprises a different fabric and connects the fabric sections 48 and later the inflation chambers 2, 4 to each other. The fabric sections 48 have the properties required for inflation chambers. The fabric section 50 can comprise a simpler material, which is subjected to fewer requirements than the other fabric sections 48. The material of the fabric section 50 should have as low a friction coefficient as possible, that is to say be slippery, to enable an easy unfolding of the side-curtain airbag. For the fabric section 50, therefore, a cost-effective material, in comparison to that of the fabric sections 48, can be used. This configuration enables a secure connection of both inflation chambers and in particular in the event of a roll-over crash, it provides improved protection for the vehicle occupants. In this way a precisely defined position of both inflation chambers is ensured. To combine the two inflation chambers, a preferably particularly cost-effective material can be located in the region between the two inflation chambers. This can be a simple fabric or a simple foil. These materials will not be subjected to high requirements, such as the material of the inflation chambers.

The fabric sections 48 are oblong and are connected to each other by the third fabric section 50, as shown in FIG. 8B. This connection can be made by welding, sewing, gluing or any suitable process. The fabric sections 48 are folded around the fold line 52 shown in FIG. 8B in such a manner that they form two superimposed layers. Between these two layers, the inflation chambers 2, 4 are created, as shown in FIG. 8C. The fabric section 50 between the two fabric sections 48 is also folded in its upper region, so that a narrow strip 54 is folded over, creating a cover for a gas supply line 8, as shown in FIG. 8C. Deviating from the representation in FIG. 8B, the fabric sections 48 can be folded in a different manner, to form a two-layered configuration. For instance a folding similar to that represented in FIGS. 6A and 6B is possible. FIG. 8C shows the folded side-curtain airbag in its finished state. The fabric sections 48 form the two inflation chambers 2, 4. The fabric section 50 forms an intermediate single-layered connecting section. In its upper region, the fabric section 50 is also folded over, to create a cover 8 for the gas supply line, as was described with reference to FIGS. 1A to 1D. The folded sections are connected to each other at their peripheral edges, to form the gas tight inflation chambers 2, 4. With this connecting process the connecting of the fabric sections 48, 50 can be simultaneously carried out, so that no additional step cycle is required. The cover 8 can also be formed by the provision of a separate fabric strip instead of by the folding over of the strip 54 of the fabric material 50.

Figure 9A:
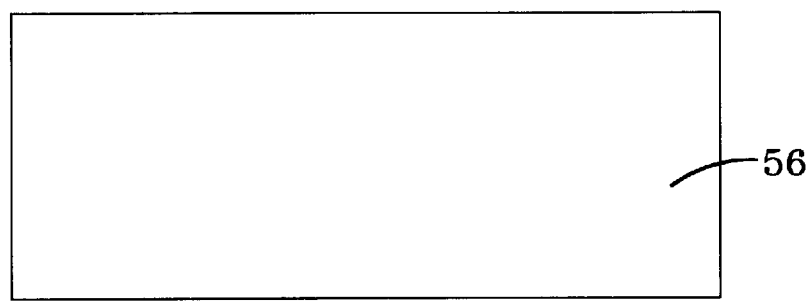
FIGS. 9A to 9C are a diagrammatic representation of an alternative method of manufacturing of a side-curtain airbag according to the invention.
Figure 9B:
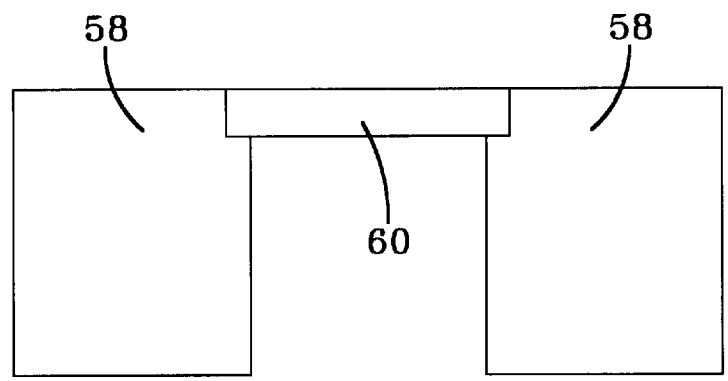
Figure 9C:
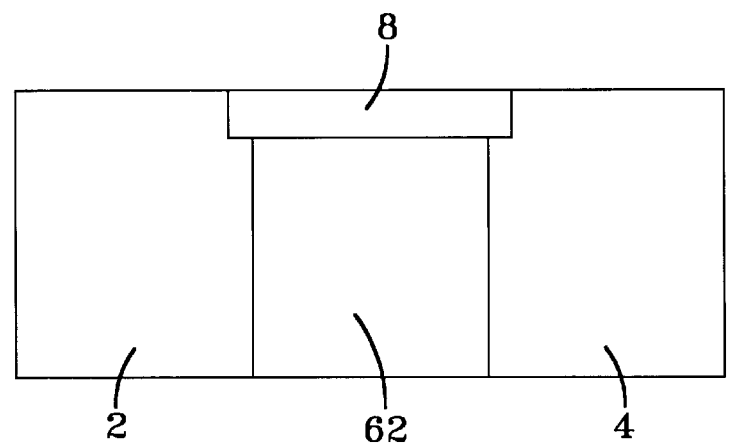

FIGS. 9A to 9C show a further method of manufacturing a side-curtain airbag according to the invention. FIG. 9A shows a first fabric section 56 of an uncoated simple fabric, which later forms the side of the side-curtain airbag that faces away from the vehicle occupant. FIG. 9B shows two further fabric layers 58 for creating the inflation chambers 2, 4. The fabric layers 48 are connected to each other by a fabric strip 60. The outer dimensions of the fabric layers 58 and the intermediate fabric strip 60 essentially correspond to the outer dimensions of the fabric layer 56. In FIG. 9C the fabric layers according to FIG. 9B are laid on the fabric layer 56 according to FIG. 9A. Subsequently, the fabric layers 58 and the connecting strip 60 are connected to the underlying fabric layer 56 by their outer peripheral edges. In this way, the two inflation chambers 2, 4 are created by the fabric layers 58 along with the underlying fabric layer 56. Between the inflation chambers 2, 4, an intermediate region 62 is created, which is formed only by the lower fabric layer 56. The connecting strip 60 together with the underlying fabric layer 56 forms a cover 8 for a gas supply line, as disclosed with reference to FIGS. 1A to 1D. The side-curtain airbag of FIG. 9C corresponds in its outer design essentially to the side-curtain airbag according to FIG. 8C, whereby only one fabric layer, however, of the inflation chambers 2, 4 is formed by a coated, gas tight fabric, whereas the other, underlying layer as well as the intermediate region 62 between the inflation chambers 2, 4 are formed merely by a simple uncoated fabric 56. A side-curtain airbag of this type ensures that the region that is turned towards the vehicle occupant is gas tight. The part of the side-curtain airbag turned away from the vehicle occupant and the regions of the airbag which are not required for a protective function are made of a simpler, more cost-effective fabric material, so that the entire side-curtain airbag can be manufactured more cost-effectively. It is possible to partly, or entirely, create the inflation chambers of different fabric materials. This is also trued for the embodiments shown in FIGS. 8A to 8C. For instance, the front or part of the front inflation chamber can be gas tight, or vice versa. For instance, one inflation chamber is coated and for the other an uncoated fabric material can be used.

All the above discussed embodiments share the characteristic that the region between the inflation chambers, which is not required to provide a protective function, comprises at the most just one layer of the same fabric, out of which the inflation chambers are also formed. As a result, parts of the rather costly fabric material, out of which the inflation chambers are made, can be economized on. Even though in each case only two inflation chambers have been described in the disclosed embodiments, embodiments in which more than two inflation chambers are foreseen are also possible. This depends in particular on the design of the vehicle in which the side-curtain airbag is to be installed. In addition, more than one dead space, in which the side-curtain airbag is not inflated to have a protective effect, can also be foreseen. Like the above-described region between the inflation chambers, these dead spaces consist of at the most one layer of the same fabric, out of which the inflation chambers are formed.

Figure 10:
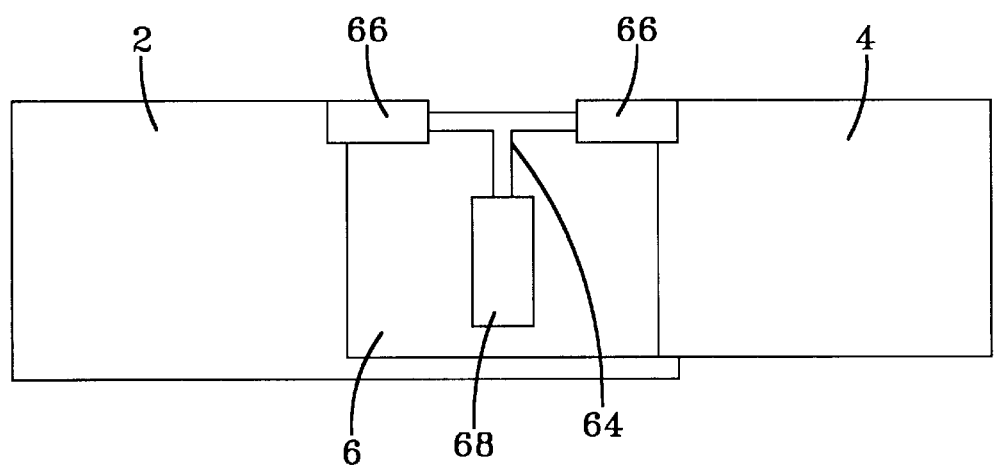
FIG. 10 is a diagrammatic representation of a side-curtain airbag module according to a preferred embodiment of the invention.

FIG. 10 is a diagrammatic representation of a side-curtain airbag module with the side-curtain airbag according to the invention. The side-curtain airbag essentially corresponds to the embodiment shown in FIG. 2E. Instead of the cover 8, however, a rigid or flexible T-shaped tube or a T-shaped hose 64 is located between the inflation chambers 2, 4 for the introduction of inflation gas. The T-shaped tube 64 can comprise metal or synthetic material. The T-shaped tube 64 is connected to the inflation chambers 2, 4 in each case with one end by flexible projection pieces 66. The flexible projection pieces 66 can be made of a fabric material or a hose material. At the third end of the T-shaped tube 64, a gas generator 68 is connected. The gas generator 68 is thus located in the free space 6 between the inflation chambers 2, 4. This embodiment also ensures supply paths of equal length for the gas to the inflation chambers 2, 4. As a result, the inflation chambers 2, 4 are essentially simultaneously inflated with gas during the ignition of the gas generator 68. In addition, the gas generator 68 can be located between the two inflation chambers in a space-saving manner.

The foregoing text discloses and describes merely exemplary embodiments of the invention. One skilled in the art will readily recognize from this disclosure changes, modifications and variations that can be made therein without departing from the spirit and scope of the invention as defined in the following claims.

I claim:

1. A side-curtain airbag comprising two inflation chambers located at a distance from one another, each inflation chamber comprising two fabric layers, in which in a region between the two inflation chambers is a free space, whereby each inflation chamber defines a single, continuous space for storing gas and two connecting strips that comprise only a single layer of fabric and extend in the free space between the inflation chambers, the two connecting strips are disposed in a crossing manner, wherein one of the connecting strips is secured to approximately the bottom of one of the inflation chambers and to approximately the top of the other inflation chamber, the other connecting strip is secured to approximately the bottom of one of the inflation chambers and to approximately the top of the other inflation chamber.

2. The side-curtain airbag according to claim 1 wherein each connecting strip comprises a fabric material that is not gas tight.

3. The side-curtain airbag according to claim 1 wherein the two inflation chambers are made from the same two fabric layers whereby the tow fabric layers are cut in a U-shape manner creating a cut out section, the cut out section is folded outward forming one inflation chamber and the remainer of the two fabric layers form the other inflation chamber.

4. The side-curtain according to claim 1 further comprising a cover in the form of a tube extending between the two inflation chambers.

* * * * *